(12) United States Patent
Detable et al.

(10) Patent No.: US 6,398,267 B1
(45) Date of Patent: Jun. 4, 2002

(54) DEVICE FOR INTERCONNECTING TWO SMOOTH TUBES IN LEAKTIGHT MANNER

(75) Inventors: Pascal Detable, Gievres; Michel Andre, Romorantin-Lanthenay, both of (FR)

(73) Assignee: Etablissements Caillau, Issy les Moulineaux (FR)

( * ) Notice: Subject to any disclaimer, the term of this patent is extended or adjusted under 35 U.S.C. 154(b) by 0 days.

(21) Appl. No.: 09/673,970

(22) PCT Filed: Jun. 2, 2000

(86) PCT No.: PCT/FR00/01526

§ 371 (c)(1),
(2), (4) Date: Dec. 14, 2000

(87) PCT Pub. No.: WO00/75548

PCT Pub. Date: Dec. 14, 2000

(30) Foreign Application Priority Data

Jun. 2, 1999 (FR) .............................................. 99 06935

(51) Int. Cl.[7] .......................... F16L 27/00; F16L 25/00
(52) U.S. Cl. .................. 285/273; 285/148.26; 285/253; 285/279; 285/420; 24/279
(58) Field of Search ........................... 285/253, 148.26, 285/420; 24/279

(56) References Cited

U.S. PATENT DOCUMENTS

| 565,698 | A | * | 8/1896 | Sparks | 24/25 |
|---|---|---|---|---|---|
| 1,978,195 | A | | 10/1934 | Haas | 24/19 |
| 4,299,012 | A | * | 11/1981 | Oetiker | 24/19 |
| 4,813,718 | A | * | 3/1989 | Matter et al. | 285/373 |
| 5,305,499 | A | * | 4/1994 | Oetiker | 24/20 |
| 5,564,167 | A | * | 10/1996 | Oetiker | 24/20 |
| 6,088,886 | A | * | 7/2000 | Gyöngyösi | 24/279 |

FOREIGN PATENT DOCUMENTS

| FR | 2 662 486 | 11/1991 |
|---|---|---|
| FR | 2 748 542 | 11/1997 |

* cited by examiner

Primary Examiner—Katherine A. Matecki
Assistant Examiner—Carlos Lugo
(74) Attorney, Agent, or Firm—Nath & Associates PLLC; Gary M. Nath; Marvin C. Berkowitz

(57) ABSTRACT

A device for coupling together in leaktight manner two smooth tubes disposed end-to-end, the device comprising a sleeve which diameter can be reduced by a tightening action, and a sealing ring (24) suitable for being disposed inside the sleeve so as to surround the ends of the two tubes. The ring is constituted by a looped flat strip (26) having two longitudinal ends (26a, 26b) suitable for coming into contact with each other when the sleeve is tightened around the tubes (20, 22). The first longitudinal end of the ring is provided with a notch (28), while the second longitudinal end of the ring is in the form of a tongue (30) suitable for being inserted into the notch. Both the width of the tongue and also the width of the notch taper in the direction going along the strip from the first longitudinal end to the second longitudinal end. When the tongue is in a partial insertion position in which it is inserted partially in the notch, the two sides (30a, 30b) of the tongue are suitable for coming into contact with the two sides (28a, 28b) of the notch while the free end (30a) of the tongue remains at a distance from the end wall (28c) of the notch, and, starting from the partial insertion position, the tongue is suitable for penetrating further into the notch under the effect of the tightening.

9 Claims, 2 Drawing Sheets

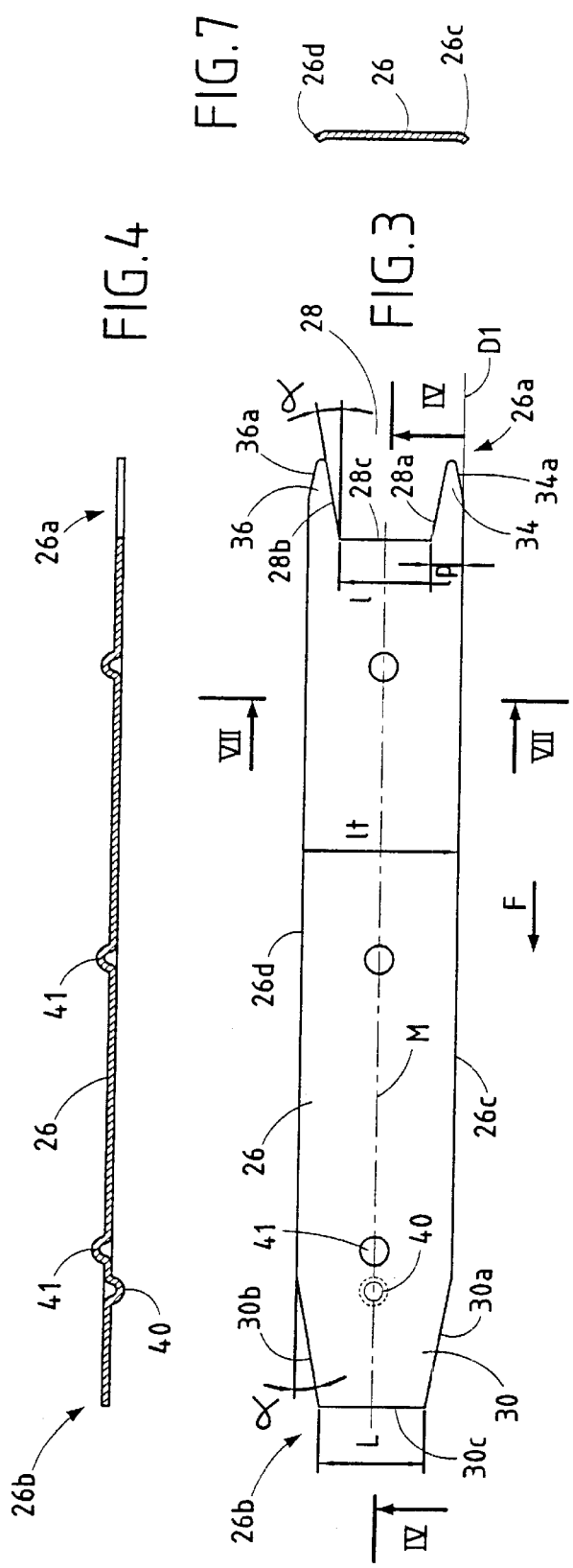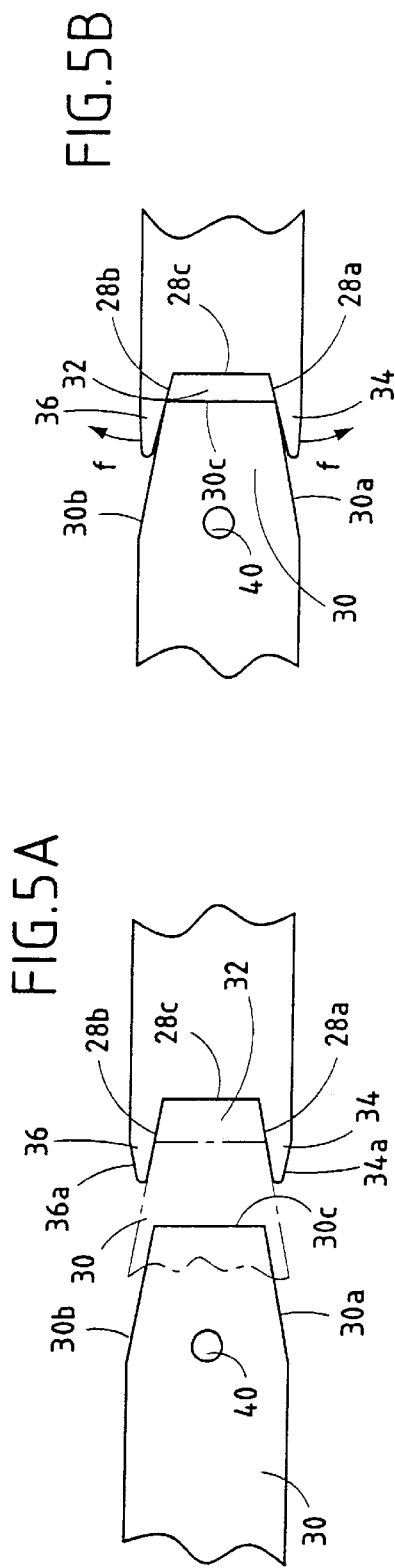

DEVICE FOR INTERCONNECTING TWO SMOOTH TUBES IN LEAKTIGHT MANNER

FIELD OF THE INVENTION

The present invention relates to a device for coupling together in leaktight manner two smooth tubes disposed end-to-end and of substantially the same diameter.

BACKGROUND OF THE INVENTION

French Patent No. 2 662 486 discloses a device of that type which comprises a sleeve suitable for being disposed around the facing ends of the two tubes, which sleeve is provided with means for reducing its diameter under the action of tightening means. That device further comprises a sealing ring suitable for being a disposed inside the sleeve so as to surround the facing ends of the two tubes, said ring being constituted by a looped flat strip having first and second longitudinal ends suitable for coming into contact with each other when, with the ring being situated inside the sleeve, said sleeve is tightened around the facing ends of the tubes.

For example, the sleeve has two free ends provided with assembly lips which define an axial slot between them. The assembly lips are suitable for co-operating with means for tightening the sleeve, which means are suitable for bringing the lips towards each other so as to reduce the diameter of the sleeve.

Devices of that type serve in particular to interconnect two exhaust tubes. The requirements as regards the leaktightness of the fitting are increasingly stringent. It might be thought that the more the sleeve is tightened onto the tubes, the more the leaktightness is improved. Indeed, it is true that one of the conditions required to obtain leaktightness is that the inside periphery of the ring must be in leaktight contact with the outside peripheries of the tubes. However, the more the sleeve is tightened, the more the diameter of the sealing ring is reduced. Thus, in order to obtain leaktightness in the region of the join between the longitudinal ends of the ring, it is necessary for said ends to be in leaktight contact as of a given degree of tightening and, in addition, for further tightening of the sleeve once said contact is established not to degrade the leaktightness, e.g. by causing the two longitudinal ends to overlap.

To that end, French Patent No. 2 662 486 proposes a ring whose longitudinal ends are bevelled so that they can be applied one against the other and be shifted transversely relative to each other as the diameter of the ring decreases. That solution is generally satisfactory because it makes it possible to avoid overlapping on tightening, even if such tightening is excessive. Unfortunately, it does not make it possible to have full control over the extent to which the two free ends press against each other, so that that pressing together might not be sufficient for the contact to be leaktight. In addition, by enabling the ends of the ring to shift transversely relative to each other, it does not make it possible for the ring to be set inside the sleeve.

French Patent Application No. 2 748 542 offers another solution consisting in providing the sealing ring with a capacity to deform so that its length is decreased when the free edges of said ring are urged into abutment against each other. For that purpose, that patent application recommends providing perforations in the vicinity of one of the edges of the ring.

That device is satisfactory and gives excellent results in particular when the sealing ring is made of a soft material such as aluminum. For other materials, in particular for aluminum-coated steel, the deformable nature of the free edges of the ring is more difficult to control, and the manufacturing costs reflect that.

Patent US 1 978 195 shows a device in which one end of the ring is provided with a U-shaped notch in which the other end, which is in the form of a tongue of constant width, is inserted. Those provisions also prevent the ends of the ring from overlapping, but they do not make it possible for them to be pressed together in leaktight manner.

SUMMARY OF THE INVENTION

An object of the present invention is to propose an improved device which, while accommodating the above-mentioned constraints, effectively makes it possible to have full control over the pressing together of the two free ends of the ring, and thus guarantees leaktight contact between said two ends even if the tightening exceeds a "normal" degree of tightening. An object of the invention is also to propose a device in which the ring can be manufactured simply and at low cost, even from materials other than aluminum, e.g. a relatively soft steel, optionally coated with aluminum.

The invention provides a device which comprises a sleeve suitable for being disposed around the facing ends of the two tubes, which sleeve is provided with means for reducing its diameter under the action of tightening means, the device further comprising a sealing ring suitable for being disposed inside the sleeve so as to surround the facing ends of the two tubes, said ring being constituted by a looped flat strip having first and second longitudinal ends suitable for coming into contact with each other when, with the ring being situated inside the sleeve, said sleeve is tightened around the facing ends of the tubes; the first longitudinal end being provided with a notch, while the second longitudinal end is in the form of a tongue suitable for being inserted into said notch.

The above-mentioned object is achieved by means of the facts that both the width of the tongue as measured from one side of said tongue to the other side thereof transversely to the strip, and also the width of the notch, as measured from one side of the notch to the other side thereof transversely to the strip taper in the direction going along the strip from the first longitudinal end to the second longitudinal end, that, when the tongue is in a partial insertion position in which it is inserted partially in the notch, the two sides of the tongue are suitable for coming into contact with the two sides of the notch while the free end of the tongue remains at a distance from the end wall of the notch, and that, starting from said partial insertion position, the tongue is suitable for penetrating further into the notch under the effect of the tightening.

By means of these provisions, the sides of the tongue can come into leaktight contact with the sides of the notch as soon as the partial insertion position is obtained, and said contact remains when tightening increases because the tongue can penetrate further into the notch. Thus, leaks are confined to the opening provided between the end wall of the notch and the free end of the tongue. To make the device leaktight, it is then necessary merely to take the precaution, during assembly, of placing the opening under an uninterrupted region of the sleeve, which region prevents leakage. For this purpose, the device advantageously further comprises means for defining the position of the sealing ring in the sleeve such that the longitudinal ends of the ring are angularly offset relative to a tightening opening provided in the sleeve.

Advantageously, the notch is defined laterally by two tabs that are capable of deforming by moving apart when the tongue advances into the notch from the partial insertion position. In fact, the notch may be made merely by forming a cut-out, on either side of which two tabs remain. In this particularly-simple embodiment which is entirely satisfactory, it is necessary merely to impart a width to each of the tabs that is such that they can deform plastically by moving apart as the tightening increases.

BRIEF DESCRIPTION OF THE DRAWINGS

The invention will be well understood and its advantages will appear more clearly on reading the following detailed description of an embodiment shown by way of non-limiting example. The description is given with reference to the accompanying drawings, in which:

FIG. 3 is a plan view of the strip that constitutes the ring, which strip is shown laid flat;

FIG. 4 is a section view of the strip of FIG. 3, on line IV—IV;

FIGS. 5A and 5B are fragmentary plan views showing the strip as looped respectively before the tongue is inserted into the notch, and when the ring is in the tightened state;

FIG. 7 shows a variant in cross-section on line VII—VII of FIG. 3.

DETAILED DESCRIPTION OF A PREFERRED EMBODIMENT

Figure 1:
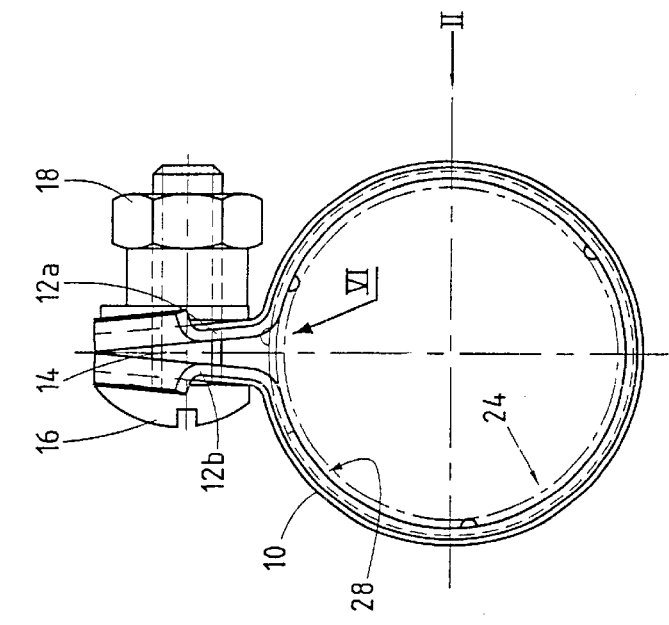
FIG. 1 is a side view of the device without the tubes that can be placed inside it.
Figure 2:
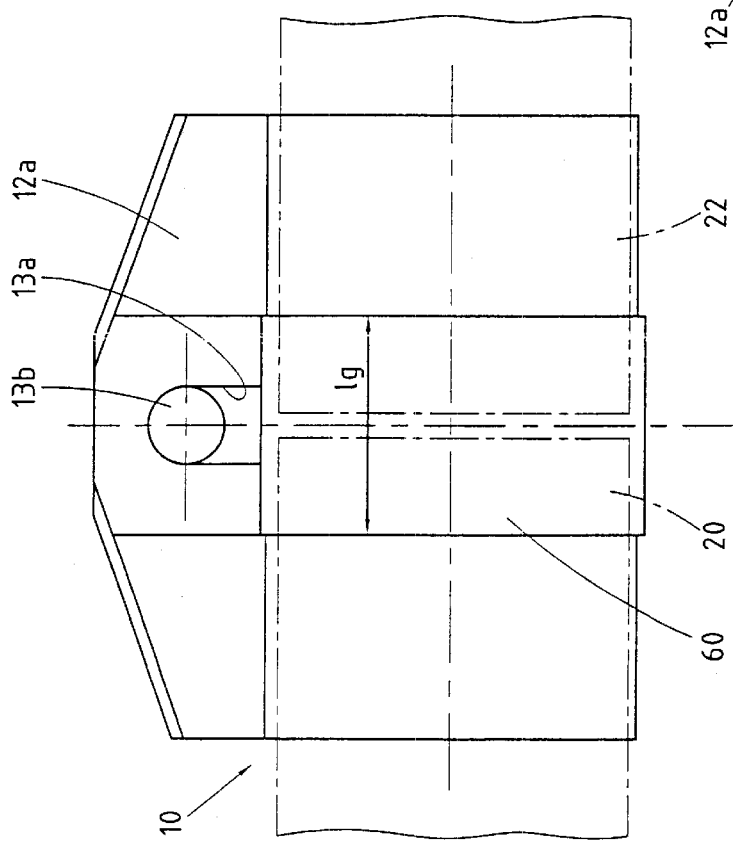
FIG. 2 is an axial view of the outside of the sleeve looking along the arrow II of FIG. 1.

With reference firstly to FIGS. 1 and 2, it can be seen that the device includes a sleeve 10 having two free ends which extend substantially axially and which are provided with assembly lips 12a and 12b. These lips define between them an axial slot 14 which, as shown in FIG. 1, tends to close on tightening the sleeve. The lips 12a and 12b co-operate with means for tightening the sleeve, which means bring them together in the example shown, the tightening means comprise a nut-and-bolt assembly comprising a bolt 16 whose shank passes through two orifices 13a and 13b provided in respective ones of the lips 12a and 12b, and a nut 18 screwed onto the shank.

Intermediate plates (not shown) serving in particular to attenuate the effect of vibrations on the tightening may be disposed firstly between the bolt head 16 and the lip 12b, and secondly between the nut 18 and the lip 12a. The bolt had may be polygonal and be prevented from rotating by a configuration of the plate with which it co-operates.

The device, which serves to interconnect two tubes of substantially the same diameter, may be disposed around the facing ends of the two tubes, which ends are shown in dot-dash lines in FIG. 2 and respectively referenced 20 and 22.

The device further includes a sealing ring 24 which, as shown in FIG. 1, is disposed inside the sleeve 10 so as to surround the facing ends of the two tubes 20 and 22. The ring 24 is constituted by a looped flat strip 26 shown in FIGS. 3 to 5. The two longitudinal ends 26a and 26b of the strip 26 are suitable for coming into contact with each other when, with the ring being disposed inside the sleeve, said sleeve is tightened around the ends of the tubes.

The first longitudinal end 26a of the ring is provided with a notch 28, while the second longitudinal end 26b is in the form of a tongue 30 which, as shown in FIG. 5B, can be inserted into the notch 28. As shown in FIG. 3, the width of the notch, as measured from one side 28a of the notch to the other side 28b thereof, transversely to the strip, tapers in the direction F going along the strip from the first end 26a to the second end 26b. This also applies to the tongue 30 whose width from one side 30a to the other 30b tapers in the same direction F. It can thus be seen that the notch tapers to a width l at the end wall 28c of the notch, and that the width of the tongue tapers to a width L at the free end 30c of said tongue.

There exists a partial insertion position (shown in dot-dash lines in FIG. 5A) in which the tongue 30 is inserted partially into the notch 28, and in which the two sides 30a and 30b of the tongue are in contact with the two sides 28a and 28b of the notch, while the free end 30c of the tongue remains at a distance from the end wall 28c of the notch, so that an opening 32 is provided between said free end and said end wall.

In the example shown, the width L of the free end 30c of the tongue is slightly greater than the width l of the end wall 28c of the notch, so that the partial insertion position is obtained when the free end of the tongue reaches a region of the notch in which the spacing between the sides 28a and 28b is equal to the width L.

Preferably, provision is made for this partial insertion position to correspond to a diameter of the ring 24 that is substantially equal to the outside diameter of the tubes, and optionally very slightly larger than said outside diameter. Starting from this situation, it is necessary to be able to tighten the ring further in order to enable leaktight contact to be established between the inside face of the ring and the outside peripheries of the tubes. The invention makes it possible to ensure that the tightening does not adversely affect the leaktight contact between the sides of the tongue and the sides of the notch because, during tightening, the tongue 30 can advance further into the notch, i.e. the free end 30c can move towards the end wall 28c by decreasing the length of the opening 32. This capacity may be related to the choice of the material from which the ring is made, or preferably to the geometrical shape of said ring.

Thus, it is possible to choose to make the ring of a steel that is capable of deforming slightly and plastically, in particular a relatively soft steel, optionally coated with aluminum. It may also be made of a material such as aluminum.

Since the ring 24 is held captive under the sleeve during tightening of said sleeve, further tightening can cause only slight deformation of the edges of the notch and/or of the edges of the tongue in order to enable the tongue to advance into the notch. In any event, the leaktight contact is always maintained, e.g. between the regions of the sides 30a and 30b of the tongue 30 that are closest to the free end 30c thereof, and the corresponding regions of the sides 28a and 28b. Naturally, in order to obtain leaktight contact, it is not necessary for firstly the sides 30a and 28a, and secondly the sides 30b and 28b to be in intimate contact over their entire overlap length. It is necessary merely to ensure that, over a portion of the overlap length, the contact is actually effective.

As shown in the figures, the notch 28 is defined laterally by two tabs 34 and 36 which are situated substantially on either side of the notch, and in alignment with the longitudinal edges 26c and 26d of the strip. As indicated by arrows f in FIG. 5B, the tabs are capable of deforming by moving apart on causing the tongue 30 to advance into the notch from the partial insertion position.

The material of the strip may be ordinary steel, and the width of each of the tabs is such that it is possible for them to move apart. For example, the width l of the end wall of the notch is substantially equal to 60% of the total width $l_t$ of the strip in its main region, while the width $l_p$ of each of the tabs 34 and 36 in the region in which they are connected to the main portion of the strip is substantially equal to only 20% of the width $l_t$. Given that, during tightening, the strip is held captive under the sleeve and that the tongue 30 is of a width at least equal to L, and that is very significantly greater than the width $l_p$, it is the tabs 34 and 36 that deform under the effect of the stresses exerted during tightening, thereby making it possible for the tongue to advance into the notch.

Advantageously, the outer sides of the tabs 34 and 36 extend set back, at least in part, from the longitudinal edges 26c and 26d of the strip 26. More precisely, and as shown in FIG. 3, the outer side of the tab 34 has a portion 34a which, relative to a straight line D1 extending the longitudinal edge 26c of the strip, slopes inwards towards the longitudinal middle axis M of the strip 26. The outer side of the tab 36 has a region 36a of shape analogous to the shape of the region 34a. This configuration, together with the configuration of the sides 28a and 28b of the notch, means that the tabs 34 and 36 flare in the direction F.

This makes it possible to ensure that, while the tabs are moving apart due to the tongue advancing into the notch, the width from one edge to the other of the strip in the region of the tabs 34 and 36 remains at the most substantially equal to the width $l_t$ of the strip in its main portion (see FIG. 5B). This configuration is advantageous because, as shown in FIG. 2, the sleeve 10 advantageously has a recessed zone 60 formed by an outwardly-projecting substantially annular stamped-out portion, which recessed zone serves as a seat in which the ring 24 can be set. The axial dimension $l_g$ of the recessed zone 60 is substantially equal to the width $l_t$ of the ring so that it is correctly set. Because of the special shape of the regions 34a and 36a of the tabs, the ring remains correctly set in the seat without any overlapping, even when the tabs move apart.

In the figures, the side 30a of the tongue is parallel to the side 28a of the notch, and the side 30b of the tongue is parallel to the side 28b of the notch. For example, these sides may be disposed to slant relative to the longitudinal middle axis M of the strip, and, relative to the longitudinal direction, they form an angle α of about ten degrees. In order for the tabs 34 and 36 to move apart to substantially the same extent, the strip is advantageously symmetrical about its longitudinal middle axis M.

Thus, in order to obtain the partial insertion position, it is possible, for example, and as shown in the figures, to choose the width L to be greater than the width l, and to make the aides of the notch 28 and the sides of the tongue parallel in pairs.

Among other possibilities, in a variant, the widths L and l may be chosen to be substantially equal and provision may be made for the sides of the tongue, at least in the vicinity of the free end thereof, to slope to a larger extent relative to the longitudinal direction of the strip than the sides of the notch.

Figure 6:
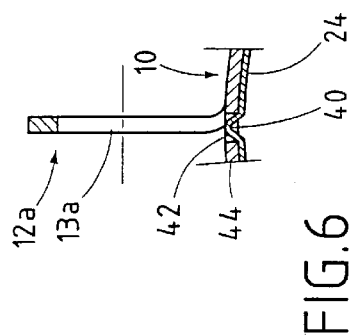
FIG. 6 is a fragmentary section view on the transverse midplane of the device, showing the detail VI of FIG. 1.

The sealing ring defines a closed space in the connection zone in which the ends of the tubes 20 and 22 are connected together, the closed space lying between the outside peripheries of the tubes and the inside periphery of the ring. The only opening in this space is the opening 32 provided between the free end 30c of the tongue and the end wall 28c of the notch. Thus, any leaks that occur all come together in said opening 32. To prevent leakage, it is necessary merely to place the ring inside the sleeve such that the opening 32 lies facing an uninterrupted portion of the sleeve. As a result, it is necessary to offset the longitudinal ends of the ring relative to the above-mentioned slot 14 in the sleeve. In order to enable guaranteed correct positioning to be obtained without relying on the watchfulness of the operator, the device is equipped with positioning means. For example, these means may comprise a stamped-out portion 40 formed in the ring 24 and projecting radially outwards therefrom when the ring is looped. As shown more clearly in FIG. 6, the periphery of the sleeve 10 is provided with a set-back or a perforation 42 in which the stamped-out portion 40 is received. Preferably, the set-back or perforation is provided in a sill 44 which extends along the periphery of the end-piece 10 and which remains when the assembly lips 12a and 12b are formed by being folded back, and when one of the openings 13a ad 13b is cut out therein.

Stamped-out portions 41 made in the other face of the strip 26 serve to set the ends 20 and 22 of the tubes relative to each other.

Naturally, leaks are avoided when leaktight contact is established between the inside periphery of the sleeve and the edges of the opening 32 constituted in particular by the free end 30c of the tongue and by the end wall 28c of the notch. Such leaktight contact is normally established merely because the surfaces in contact are smooth and abutting against each other.

In a variant, it is possible to provide outwardly-raised margins on the edges of the opening 32. More precisely, on cutting out the ends of the ring, it is possible for the sides 28a and 28b of the notch, the end wall 28c of said notch, and the free end 30c of the tongue to be raised slightly outwards. Regardless of the extent to which the tongue advances into the notch, a raised margin is thus formed that extends over the entire periphery of the opening 32. The margin is of low thickness, e.g. in the range 5% to 30% of the thickness of the strip 26, thereby imparting relative flexibility to it so as that it can deform on pressing the sleeve against the ring, thereby achieving leaktight contact between the edges of the opening and the inside periphery of the sleeve.

Similarly, as shown in FIG. 7, it is possible to choose to provide the strip 26 with margins that are turned up towards the inside of the ring, and that extend over the longitudinal edges 26c and 26d thereof. Thus, on tightening the ring against the outside peripheries of the tubes, the margins are suitable for co-operating with said outside peripheries and, by providing them with a relatively low thickness, they are made deformable so as to achieve the leaktight contact. The margins advantageously extend over the entire longitudinal edges 26c and 26b of the ring, including the outer sides of the tabs 34 and 36, or even at least a portion of each of the sides 30a and 30b of the tongue. They thus constitute sealing beads disposed around the entire periphery of the sealing ring 24 and compatible with the presence of the above-mentioned raised margin of the opening 32.

What is claimed is:

1. A device for coupling together in leaktight manner two smooth tubes disposed end-to-end and of substantially the same diameter, the device comprising a sleeve suitable for being disposed around the facing ends of the two tubes, which sleeve is provided with means for reducing its diameter under the action of tightening means, the device further comprising a sealing ring suitable for being disposed inside the sleeve so as to surround the facing ends of the two tubes, said ring being constituted by a flat strip, wound on itself and having first and second longitudinal ends suitable for coming into contact with each other when, with the ring being situated inside the sleeve, said sleeve is tightened around the facing ends of the tubes, the first longitudinal end of the sealing ring being provided with a notch, while the second longitudinal end of said ring is in the form of a tongue suitable for being inserted into said notch, wherein both a the width of the tongue as measured from one side of said tongue to an other side thereof transversely to the strip, and also a width of the notch, as measured from one side of the notch to an other side thereof transversely to the strip taper in a direction going along the strip from the first longitudinal end to the second longitudinal end, wherein, when the tongue is in a partial insertion position in which it is inserted partially in the notch, the two sides of the tongue are suitable for coming into contact with the two sides of the notch while a free end of the tongue remains at a distance from an end wall of the notch, and wherein, starting from said partial insertion position, the tongue is suitable for penetrating further into the notch under the effect of the tightening.

2. A device according to claim 1, wherein the notch is defined laterally by two tabs that are capable of deforming by moving apart when the tongue advances into the notch from the partial insertion position.

3. A device according to claims 2, wherein the outer sides of the tabs extend set back at least in part relative to the longitudinal edges of the strip.

4. A device according to claim 1, wherein the width of the free end of the tongue is greater than the width of the end wall of the notch.

5. A device according to claim 2, wherein the width of the free end of the tongue is greater than the width of the end wall of the notch.

6. A device according to claim 1, wherein the sides of the notch and the sides of the tongue that are organized to come respectively into contact with one another are respectively mutually parallel.

7. A device according to claims 1, further comprising means for defining the position of the sealing ring in the sleeve such that the longitudinal ends of the ring are angularly offset relative to a tightening opening provided in the sleeve.

8. A device according to claim 2, further comprising means for defining the position of the sealing ring in the sleeve such that the longitudinal ends of the ring are angularly offset relative to a tightening opening provided in the sleeve.

9. A device according to claim 1, wherein the sealing ring is provided with sealing beads disposed around its periphery.

* * * * *